US008523208B2

(12) United States Patent
Rezania et al.

(10) Patent No.: US 8,523,208 B2
(45) Date of Patent: Sep. 3, 2013

(54) INDEPENDENT SUSPENSION MECHANISM

(75) Inventors: Parto Rezania, Markham (CA); Arnold Heron, Whitby (CA)

(73) Assignee: Timbren Industries Inc., Whitby (CA)

( * ) Notice: Subject to any disclaimer, the term of this patent is extended or adjusted under 35 U.S.C. 154(b) by 18 days.

(21) Appl. No.: 13/099,567

(22) Filed: May 3, 2011

(65) Prior Publication Data
US 2011/0272910 A1 Nov. 10, 2011

Related U.S. Application Data

(60) Provisional application No. 61/331,055, filed on May 4, 2010.

(51) Int. Cl.
*B60G 3/12* (2006.01)
*B60G 7/00* (2006.01)
*B60G 11/60* (2006.01)

(52) U.S. Cl.
USPC ............. 280/124.128; 267/257; 280/681; 280/124.116; 280/124.153; 280/124.169; 280/124.177

(58) Field of Classification Search
USPC .......... 267/292, 140.2, 141, 153, 257, 258; 280/676, 677, 681, 682, 687, 124.116, 124.125, 280/124.128–124.131, 124.153, 124.164, 280/124.165, 124.169, 124.177
See application file for complete search history.

(56) References Cited

U.S. PATENT DOCUMENTS

| 3,482,852 | A | * | 12/1969 | Hickman | 280/124.101 |
|---|---|---|---|---|---|
| 3,556,554 | A | * | 1/1971 | Saward | 280/124.106 |
| 3,779,576 | A | * | 12/1973 | Malcolm | 280/684 |
| 3,964,764 | A | * | 6/1976 | Rickardsson | 280/124.116 |
| 3,966,223 | A | * | 6/1976 | Carr | 280/124.128 |
| 4,192,528 | A | * | 3/1980 | Bergquist | 280/677 |
| 4,792,148 | A | * | 12/1988 | Hintz | 280/149.1 |
| 5,013,063 | A | * | 5/1991 | Mitchell | 280/124.162 |
| 5,037,126 | A | * | 8/1991 | Gottschalk et al. | 280/124.116 |
| 5,058,916 | A | * | 10/1991 | Hicks | 280/86.5 |
| 5,403,031 | A | * | 4/1995 | Gottschalk et al. | 280/86.5 |
| 5,540,454 | A | * | 7/1996 | VanDenberg et al. | 280/81.1 |
| 5,588,665 | A | * | 12/1996 | Pierce et al. | 280/86.5 |
| 5,746,441 | A | * | 5/1998 | VanDenberg | 280/124.116 |
| 5,791,681 | A | * | 8/1998 | VanDenberg | 280/124.116 |
| 5,868,418 | A | * | 2/1999 | VanDenberg | 280/86.5 |
| 6,073,946 | A | * | 6/2000 | Richardson | 280/86.5 |
| 6,416,069 | B1 | * | 7/2002 | Ramsey | 280/124.116 |
| 6,471,223 | B1 | * | 10/2002 | Richardson | 280/86.5 |
| 7,360,773 | B2 | * | 4/2008 | Gottschalk | 280/86.5 |
| 7,926,836 | B2 | * | 4/2011 | Noble et al. | 280/677 |
| 2006/0113741 | A1 | * | 6/2006 | Chalin | 280/124.116 |
| 2006/0157309 | A1 | * | 7/2006 | Chalin et al. | 188/266 |
| 2011/0057371 | A1 | * | 3/2011 | Rezania | 267/228 |

* cited by examiner

*Primary Examiner* — Joseph Rocca
*Assistant Examiner* — Laura Freedman
(74) *Attorney, Agent, or Firm* — Elias Borges

(57) ABSTRACT

An independent suspension with no axle is disclosed which includes a hanger and a control arm having opposite first and second ends pivotally mounted to the hanger between the first and second ends. The suspension unit further includes a spindle arm mounted to the first end of the control arm. The suspension unit also includes a jounce spring on the control arm and a rebound spring mounted between the control arm and the hanger. The control arm and hanger are configured such that when the first end of the control arm pivots towards the frame of the vehicle the jounce spring is compressed and the rebound spring is relaxed and when the first end of the control arm moves away from the frame the jounce spring is relaxed and the rebound spring is compressed.

9 Claims, 12 Drawing Sheets

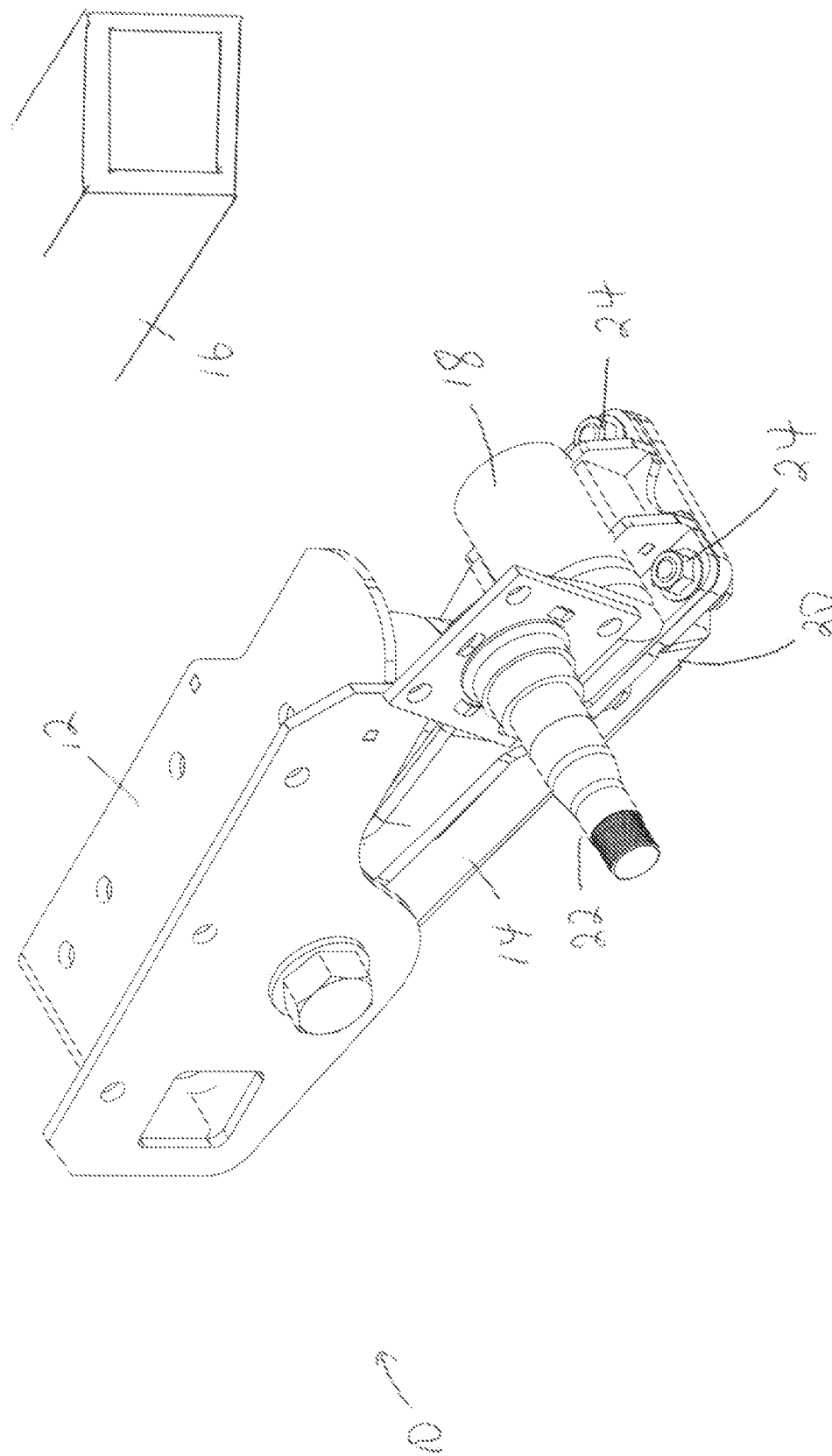

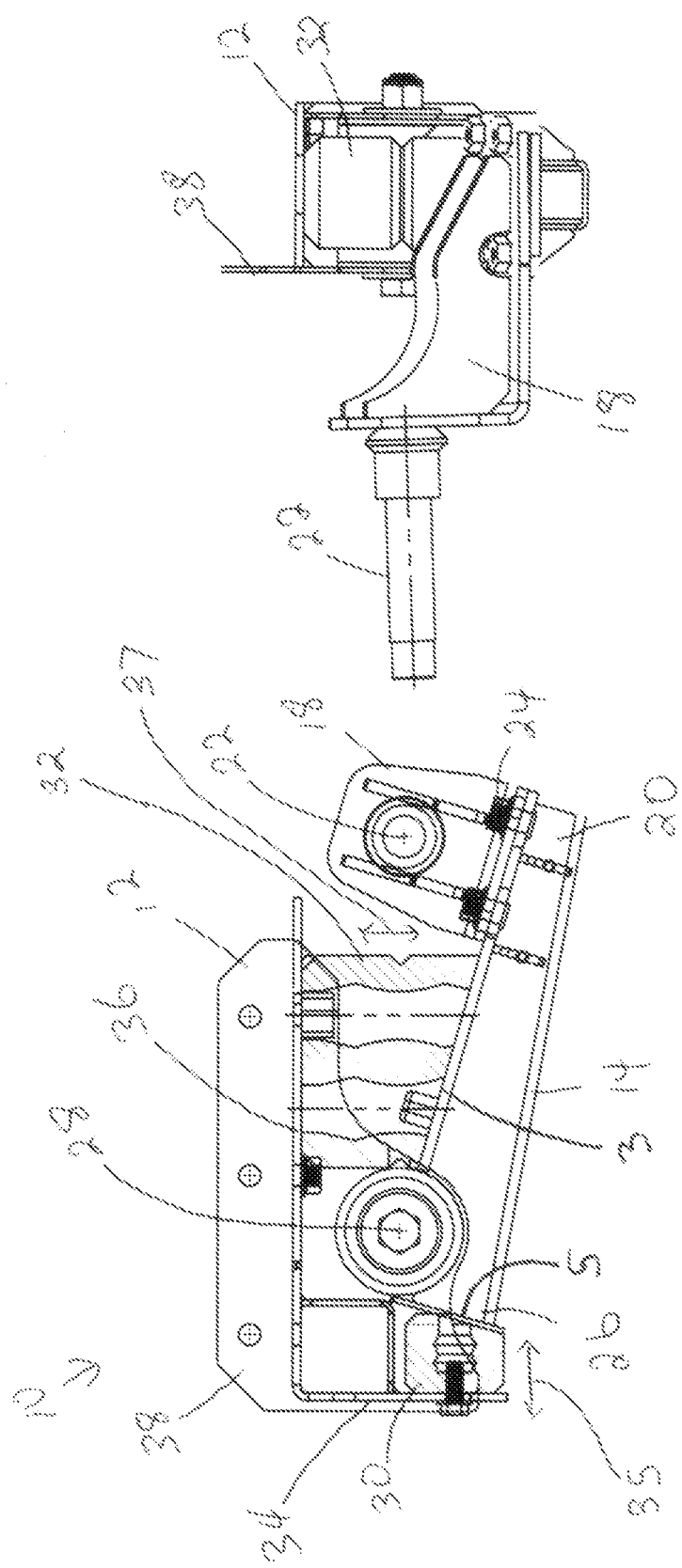

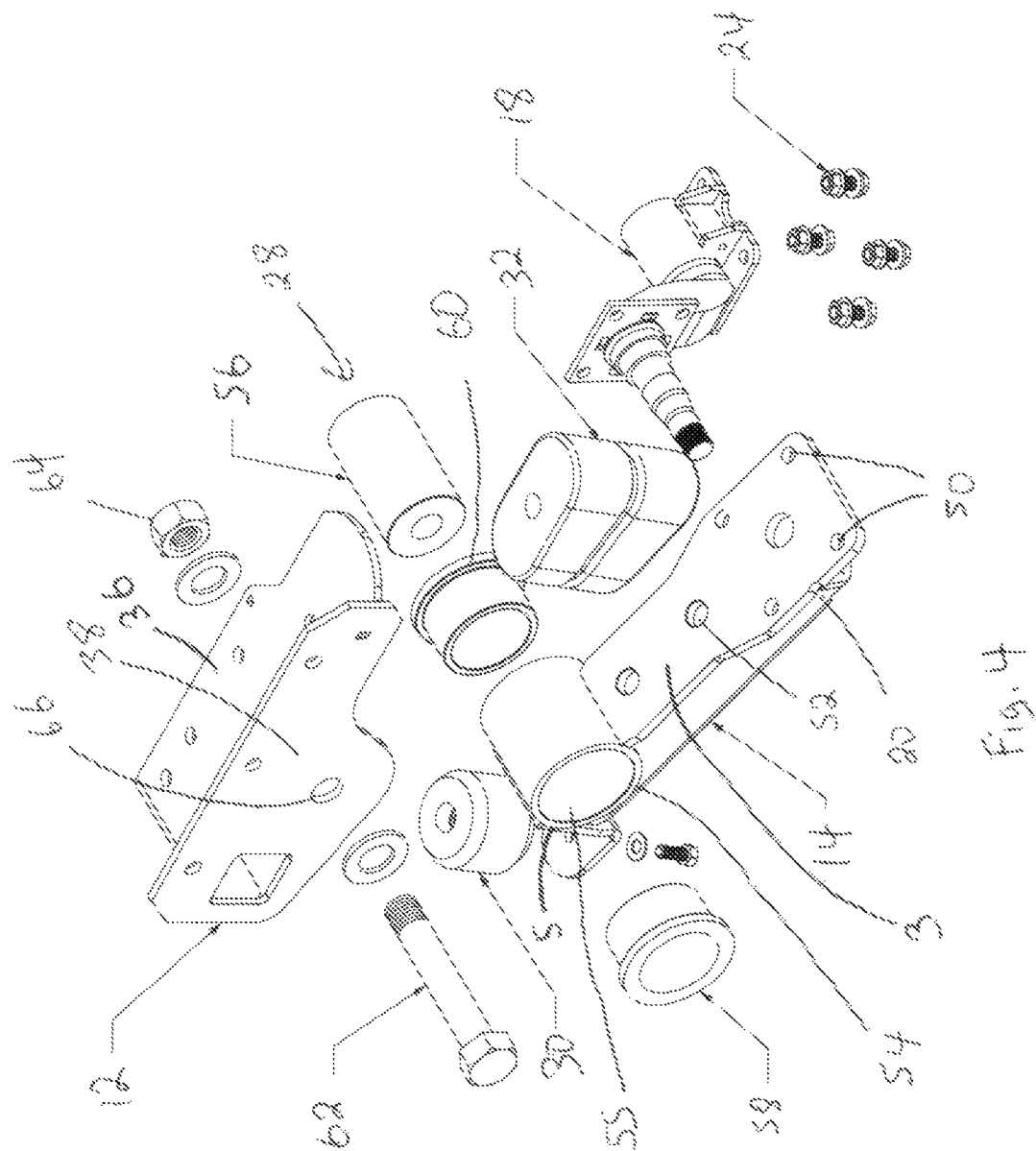

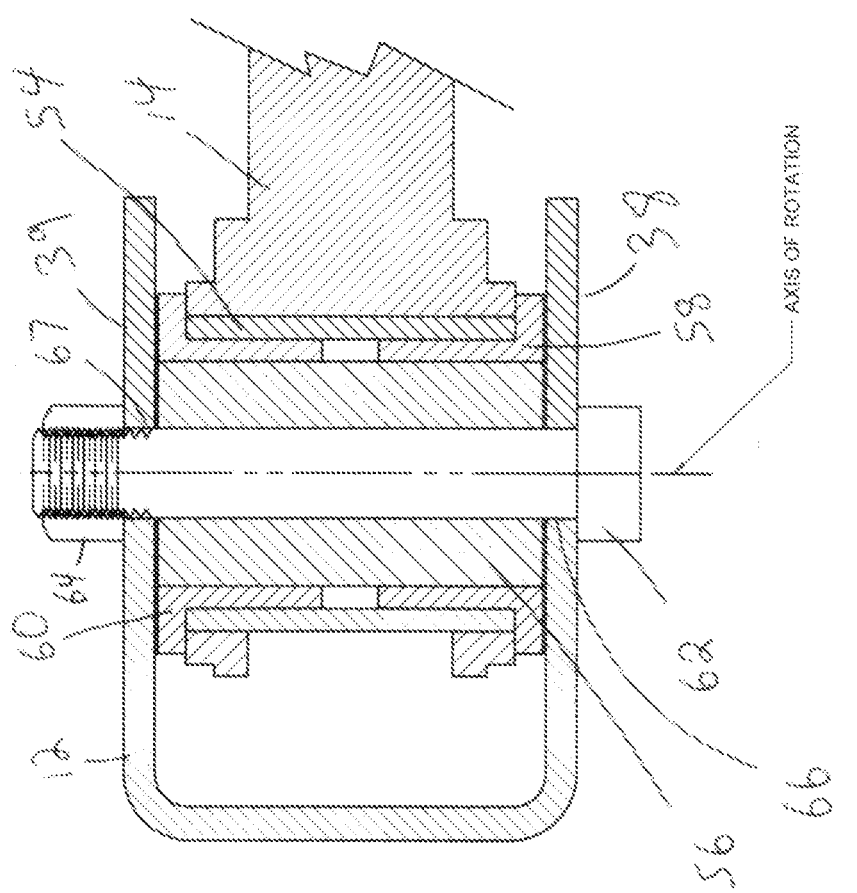

SECTION A-A

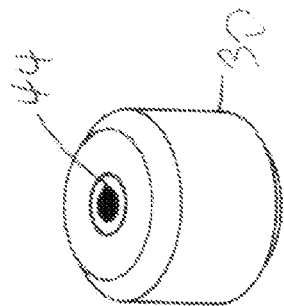
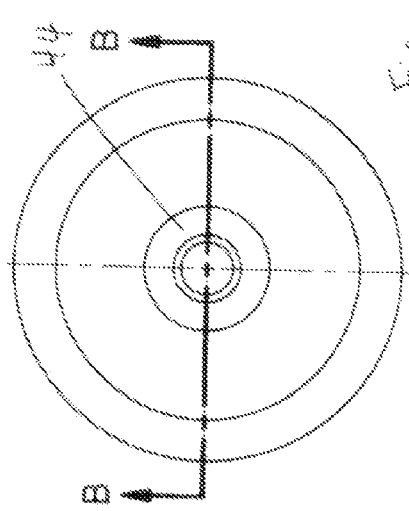
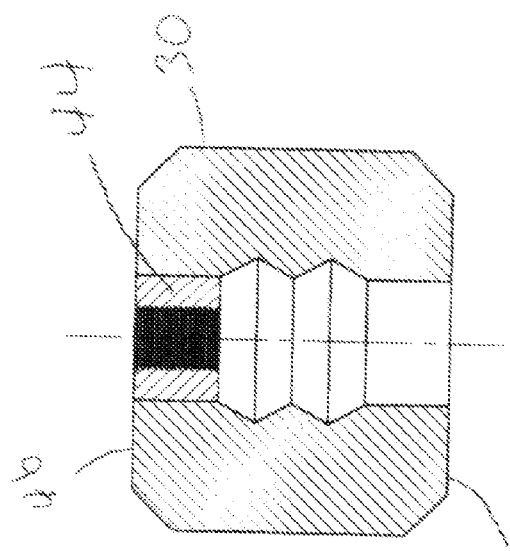

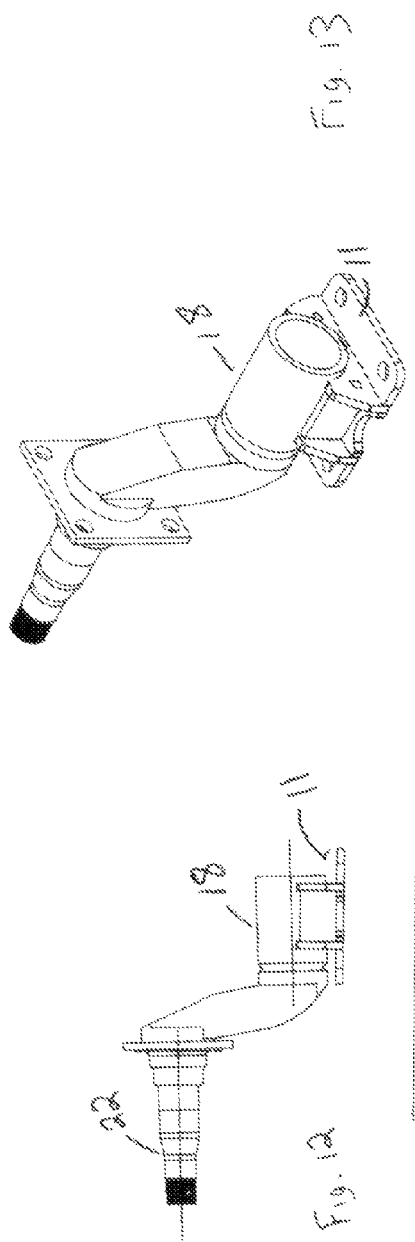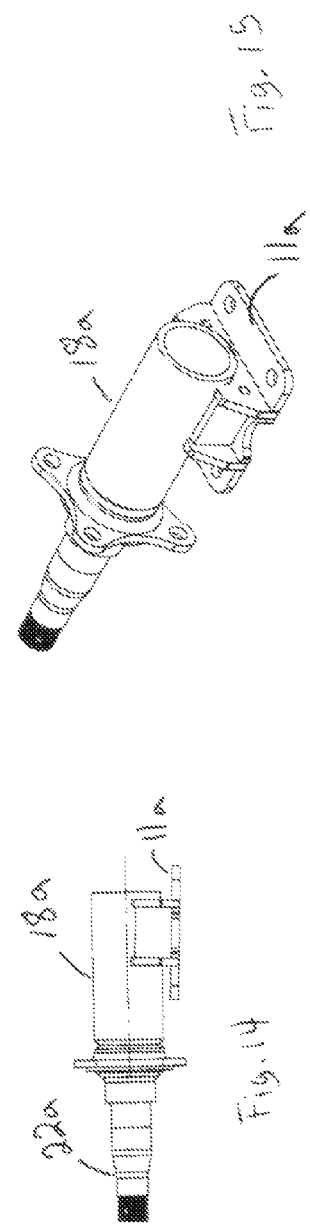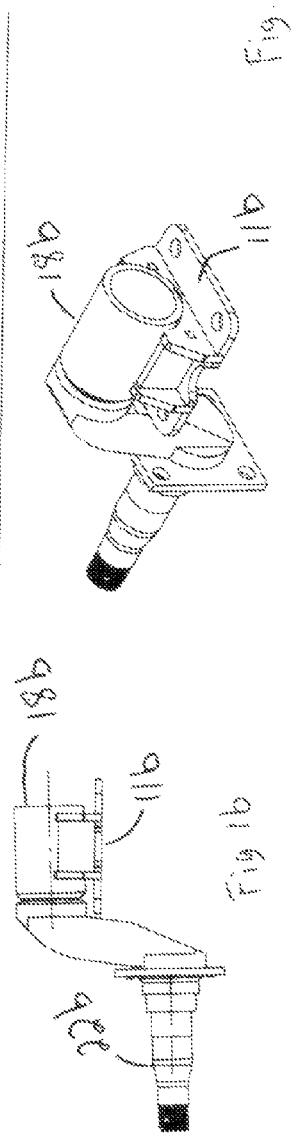

—VERTICAL OFFSET CREATES A CAMBER
—HORIZONTAL OFFSET CREATES A TOE-IN

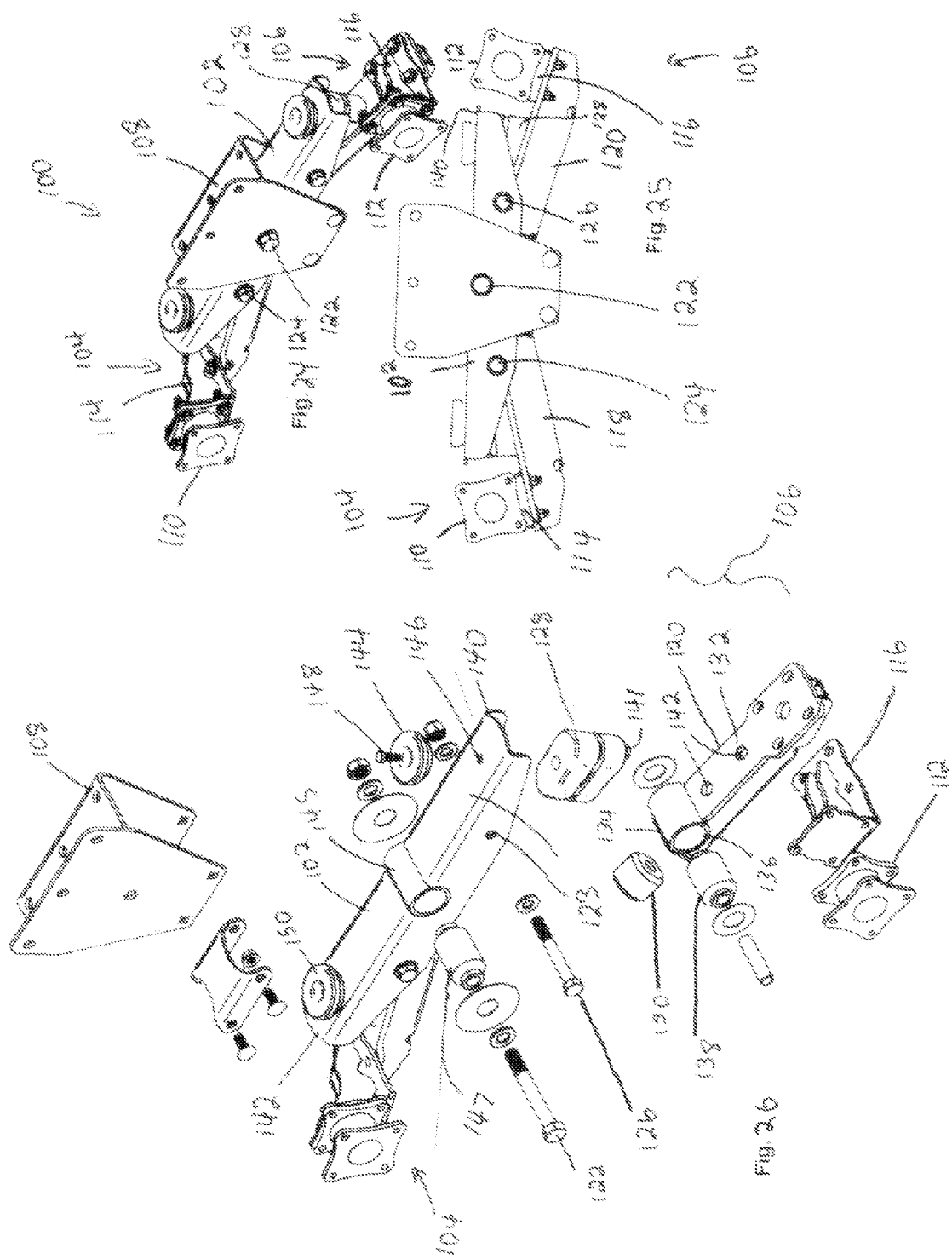

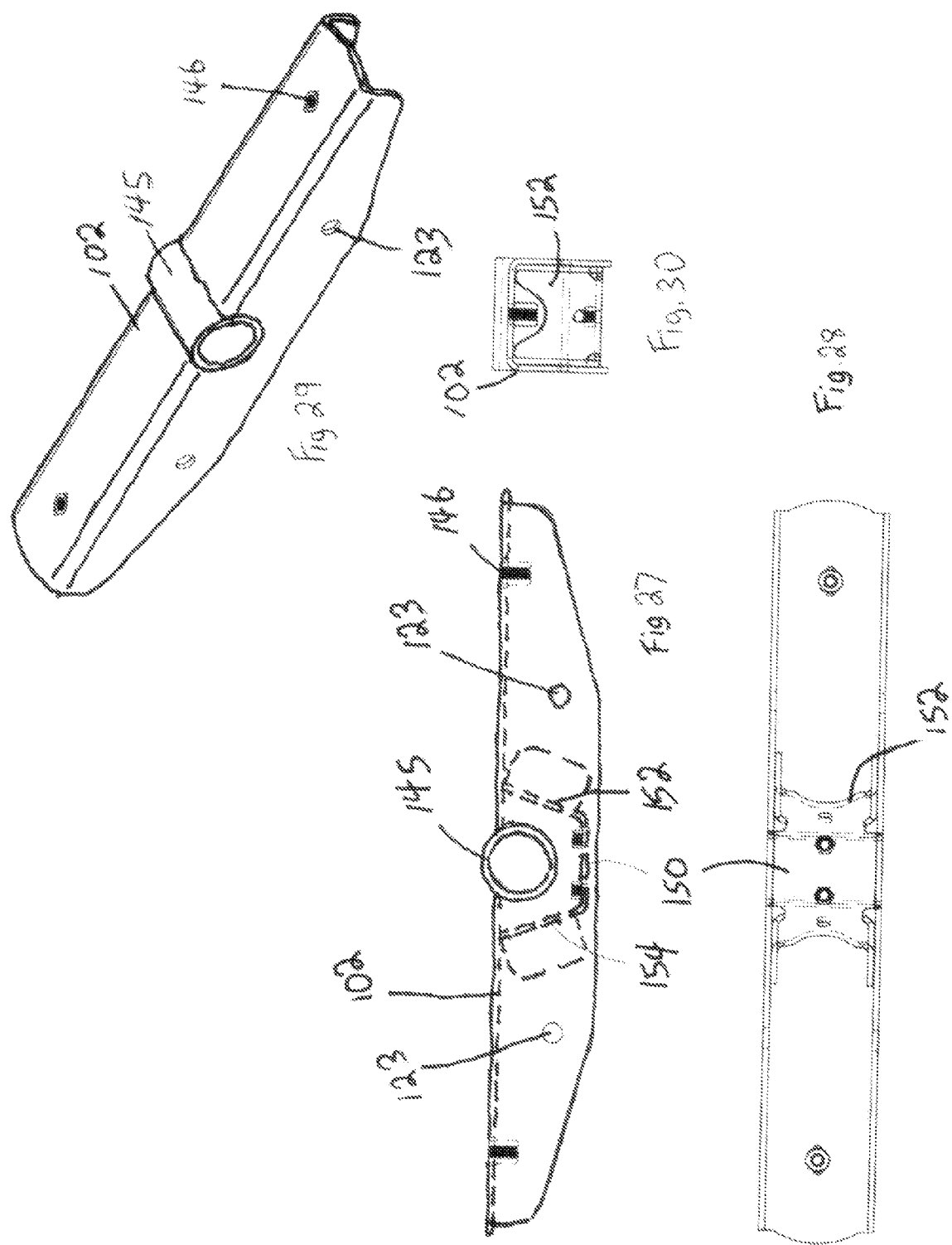

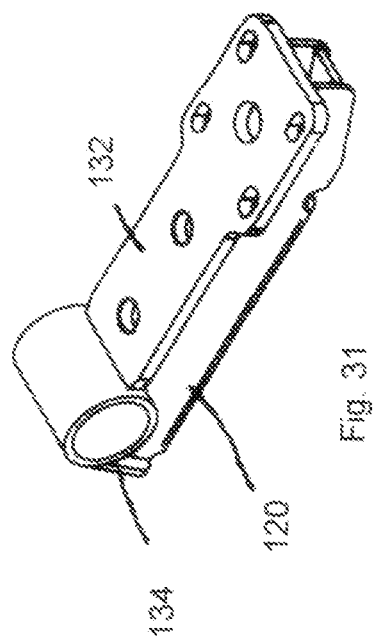
Fig. 31
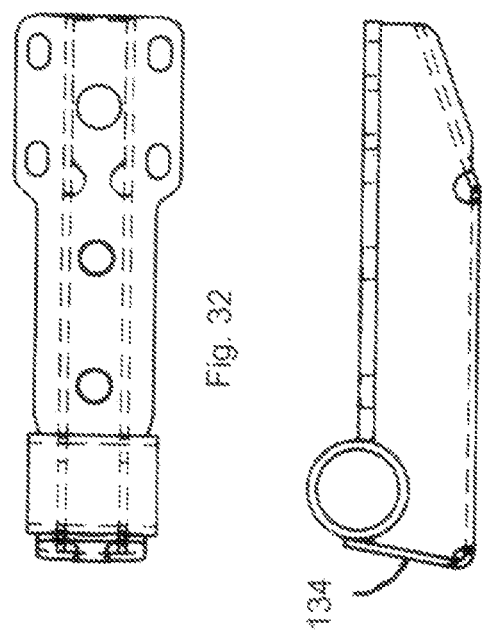
Fig. 32
Fig. 33

INDEPENDENT SUSPENSION MECHANISM

CROSS REFERENCE TO RELATED APPLICATION

This application claims priority from U.S. provisional application No. 61/331,055 filed May 4, 2010 the entirety of which is incorporated herein by reference.

FIELD OF THE INVENTION

The invention relates generally to independent suspensions for use with trailers including suspensions which do not use an axle.

BACKGROUND OF THE INVENTION

Suspensions for vehicles, namely trailers, generally use one or more coil or leaf springs mounted to the vehicle frame by a hanger bracket of some sort. These suspensions are useful, but they often suffer from several problems such as bulky construction, heavy weight and complex assembly and construction due their use of metal suspension springs. Elastomeric springs have certain advantages over metal springs, such as compactness. Also, elastomeric springs have the advantage of providing vibration dampening properties. Several attempts at creating a suspension unit using elastomeric polymer spring components have been tried, but these suspension units are generally bulky and often employ axles and other large components which restrict the ease of their deployment. An improved suspension system which employs elastomeric springs to create a compact and efficient design is desirable, particularly for axle free applications.

SUMMARY OF THE INVENTION

The present invention overcomes the disadvantages of the prior art by providing a suspension unit for a vehicle, the suspension unit being simple and compact, robust, easy to maintain and does not require an axle. The suspension unit made in accordance with one aspect of the present invention includes a hanger for mounting to the vehicle's frame. A control arm is provided which has opposite first and second ends, the control arm being pivotally mounted to the hanger at a pivot point positioned between the first and second ends of the control arm. The suspension unit further includes a spindle arm mounted to the first end of the control arm, the spindle arm configured to mount to the wheel. The suspension unite also includes a jounce spring made of an elastomeric polymer material mounted between the control arm and the hanger at a first point on the control arm positioned between the pivot point and the first end. The suspension unit also includes a rebound spring made of an elastomeric polymer material mounted between the control arm and the hanger at a second point of the control arm adjacent the second end. The control arm and hanger are configured such that when the first end of the control arm pivots towards the frame of the vehicle the jounce spring is compressed and the rebound spring is relaxed. The control arm and the hanger are further configured such that when the first end of the control arm moves away from the frame the jounce spring is relaxed and the rebound spring is compressed.

DESCRIPTION OF THE DRAWINGS

FIG. 1 is a perspective view of an independent suspension unit made in accordance with the present invention for use on the left side of a vehicle.

FIG. 2 is a cross sectional view of the suspension unit shown in FIG. 1.

FIG. 3 is a rear view of the suspension unit shown in FIG. 1.

FIG. 4 is an exploded view of the suspension unit shown in FIG. 1.

FIG. 5 is a cross sectional view of the pivotal connection portion of the suspension unit shown in FIG. 1.

FIG. 9 is a perspective view of the rebound spring portion of the present invention.

FIG. 10 is a top view of the rebound spring shown in FIG. 9.

FIG. 11 is a sectional view taken along line B-B in FIG. 11.

FIG. 12 is a side view of a preferred embodiment of the spindle portion of the present invention.

FIG. 13 is a perspective view of the spindle portion shown in FIG. 12.

FIG. 14 is a side view of another preferred embodiment of the spindle portion of the present invention.

FIG. 15 is a perspective view of the spindle portion shown in FIG. 14.

FIG. 16 is a side view of another preferred embodiment of the spindle portion of the present invention.

FIG. 17 is a perspective view of the spindle portion shown in FIG. 16.

FIG. 24 is a perspective view of a two wheeled suspension unit made in accordance with the present invention.

FIG. 25 is a side view of the suspension unit shown in FIG. 24.

FIG. 26 is an exploded view of the suspension unit shown in FIG. 24.

FIG. 27 is a side view of the equalizer portion of the suspension unit shown in FIG. 24.

FIG. 28 is a bottom view of the equalizer shown in FIG. 27.

FIG. 29 is a perspective view of the equalizer shown in FIG. 27.

FIG. 30 is an end view of the equalizer shown in FIG. 27.

FIG. 31 is a perspective view of the control arm portion of the suspension shown in FIG. 24.

FIG. 32 is a top view of the control arm shown in FIG. 31.

FIG. 33 is a side view of the control arm shown in FIG. 31.

In the drawings like characters of reference indicate corresponding parts in the different figures.

DETAILED DESCRIPTION OF THE INVENTION

Figure 6:
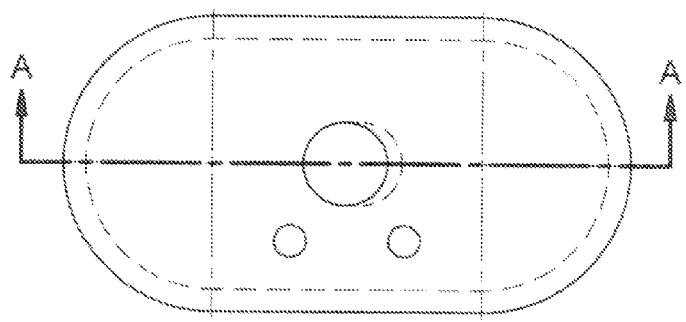
FIG. 6 is a top view of the jounce spring portion of the present invention.

Referring firstly to FIG. 1 a suspension system made in accordance with the present invention, shown generally as item 10 consists of a hanger bracket 12 rigidly mounted to a trailer frame 16 by means known generally in the art, such as bolts (not shown). A control arm 14 is pivotally mounted to hanger 12 and has a spindle 18 mounted on end 20 thereof. Spindle 20 has spindle arm 22 for mounting to a wheel (not shown). Spindle 18 is mounted to end 20 of control arm 14 by removable bolts 24. Referring now to FIGS. 2 and 3, control arm 14 has first end 20 and opposite second end 26 and is pivotally connected to hanger 12 at pivotal connection 28 which is positioned between ends 20 and 26. Jounce spring 32 is positioned between control arm 14 and hanger 12 such that when end 20 of the control arm pivots upwardly towards the hanger, the jounce spring is compressed. Jounce spring 32 is positioned between end 20 and pivotal connection 28. Rebound spring 30 is positioned between hanger 12 and arm 14 such that when end 20 of the control arm pivots downwardly, away from hanger 12, the rebound spring is compressed. Rebound spring 30 is positioned adjacent end 26 of the control arm. Hanger 12 has an angular member having top wall 36 and perpendicular wall 34 and reinforcing web (side wall) 38. Control arm 14 has an angled flat surface 5 which is at a near 90° angle from top surface 3 of the control arm at end 26. Rebound spring 30 is positioned between flat surface 5 of end 26 of control arm 14 and back wall 34 of hanger 12 such that when end 20 of the control arm moves downwardly away from the hanger by the action of jounce spring 32, flat surface 5 of end 26 of the control arm is urged towards perpendicular wall 34 and the rebound spring is compressed. Rebound spring 30 urges end 26 away from perpendicular wall 34 thereby forcing end 20 upwardly. Jounce spring 32 and rebound spring 30 therefore act in opposition to keep control arm 14 steady. Preferably, both jounce spring 32 and rebound spring 30 are preloaded in order to keep control arm 14 steady. Positioning rebound spring between flat surface 5 and perpendicular wall 34 creates a more compact design.

Control arm 14, hanger 12, and jounce spring 32 are all positioned such that the direction of compression and relaxation of jounce spring 32, which is represented by arrow 37, is substantially vertical. This ensures that jounce spring 32 is performing its shock absorbing role most efficiently. In contrast, control arm 14, hanger 12 and rebound spring 30 are all positioned such that the direction of compression and relaxation of rebound spring 30, which is represented by arrow 35, is substantially horizontal and approximately perpendicular to the movement of jounce spring 32. This positioning of rebound spring 30 ensures a more compact design and a more efficient operation of the rebound spring.

Figure 7:
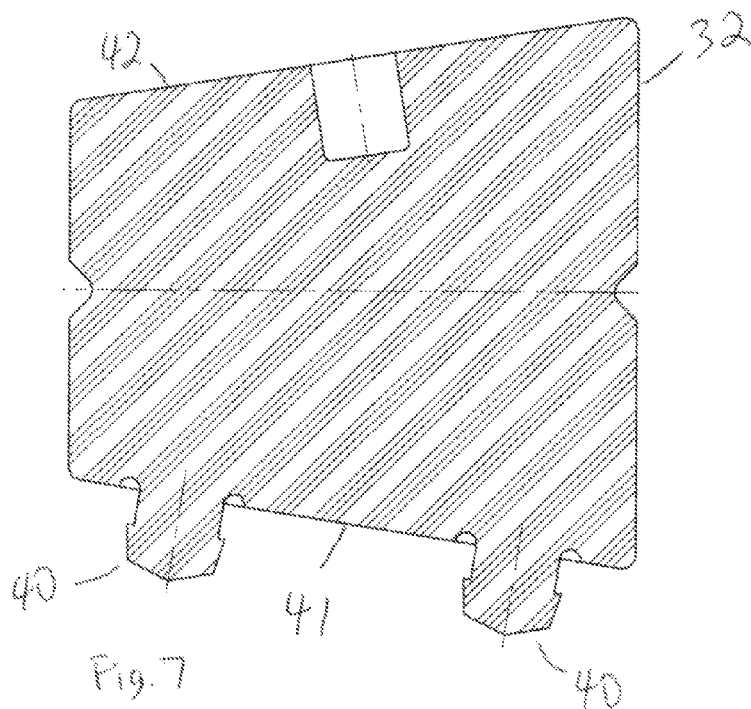
FIG. 7 is a cross sectional view taken along line A-A in FIG. 6.
Figure 8:
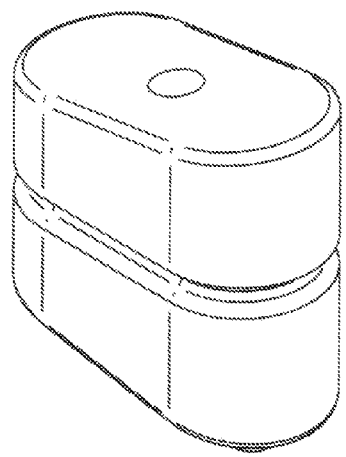
FIG. 8 is a perspective view of the jounce spring portion of the present invention.
Figure 18:
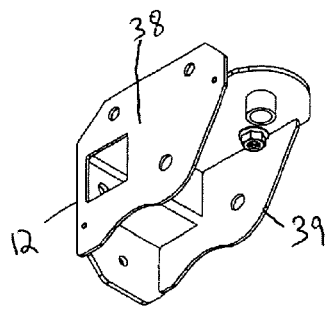
FIG. 18 is a perspective view from underneath of the hanger portion of the present invention.
Figure 19:
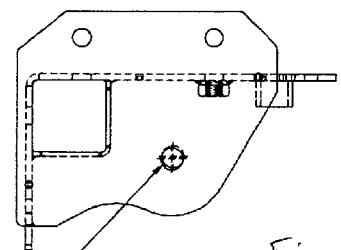
FIG. 19 is a side view of the hanger portion of the present invention.

Jounce spring 32 and rebound spring 30 are both made from an elastomeric polymer such as natural or synthetic rubber. Rubber springs are not only highly resilient, tough and durable, but they also have a vibration dampening quality which makes their use as suspension springs advantageous. The springs are also provided with apertures so that the springs can be held in place by short mounting bolts. As best seen in FIGS. 6 through 8, jounce spring 32 is a largely solid block of rubber which is slightly tapered and has protruding pins 40 which makes it possible to mount the spring to the control arm (see FIG. 4) without additional hardware. Flat surfaces 41 and 42 are provided to maximize the contact with the other components of the suspension unit such as the control arm and hanger. As best seen in FIG. 4, control arm 14 has top surface 3 which is provided with holes 52 for receiving and holding jounce spring 32. Jounce spring 32 is positioned between top surface 3 and top wall 36 of hanger 12. This ensures that the compression of jounce spring 32 is substantially vertical. As best seen in FIGS. 9, 10 and 11, rebound spring 30 consists of a cylindrical rubber member having molded in threaded bushing 44 and opposite flat surfaces 46 and 48. Threaded bushing 44 makes it easier to mount the rebound spring.

Referring now to FIG. 4, pivotal connection 28 which pivotally connects control arm 14 to hanger 12 consists of a cylindrical bushing sleeve 56 which is dimensioned to be received in barrel portion 54 of control arm 14. Barrel portion 54 has an internal bore 55 dimensioned to receive sleeve 56. Control arm bushings 58 and 60 are also configured to fit snuggly within bore 55 of barrel portion 54 with sleeve 56 positioned between them. As best seen in FIG. 5, hanger 12 has web (flange) portions 38 and 39 each having an aperture 66 and 67, respectively, which are substantially coaxially aligned and dimensioned to receive control arm pivot pin 62. Control arm pivot pin 62 is dimensioned to hold bushings 58 and 60 and sleeve 56 within barrel portion 54 when they are all coaxially aligned and assembled as shown in FIG. 5. Sleeve 56 and bushings 58 and 60 permit control arm 14 to pivot freely on hanger 12.

Referring back to FIG. 4, control arm 14 has apertures 50 located at end 20 to receive bolting hardware 24 so as to securely mount spindle 18. Control arm 14 also has apertures 52 which are dimensioned to receive pins 40 (see FIG. 7) of the jounce spring. Since spindle 18 is mounted to end 20 of control arm 14 via bolts 24, it is possible to replace spindle 18 in the event the spindle becomes damaged or worn. Alternatively, it is possible to adjust the ride height of the vehicle simply by replacing spindle 18. FIGS. 12 to 17 illustrate three different embodiments of spindle 18 designed to accommodate three different ride heights. FIGS. 12 and 13 show a preferred embodiment of spindle 18 with a spindle arm which is higher than the spindle mounting base 11. This configuration effectively lowers the ride height of the vehicle. FIGS. 14 and 15 show an alternate embodiment of the spindle, namely spindle 18a, wherein the spindle arm 22a is more or less at the same level as spindle mounting base 11a. This embodiment of spindle would be used to obtain a normal ride height. FIGS. 16 and 17 show an alternate embodiment of the spindle, namely spindle 18b, wherein the spindle arm 22b is lower than the spindle mounting base 11b. This type of spindle would be used to increase the ride height of the vehicle. Spindle mounting bases 11, 11a and 11b are virtually identical so that all three spindles could be interchanged.

Figure 20:
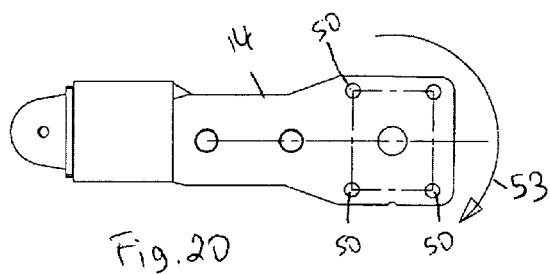
FIG. 20 is a top view of the control arm portion of the present invention.
Figure 21:
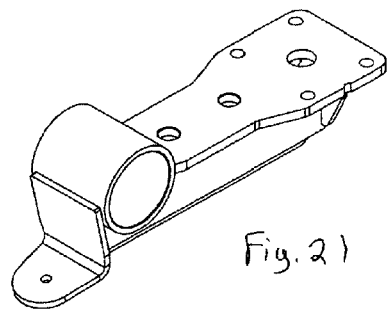
FIG. 21 is a perspective view of the control arm portion of the present invention.
Figure 22:
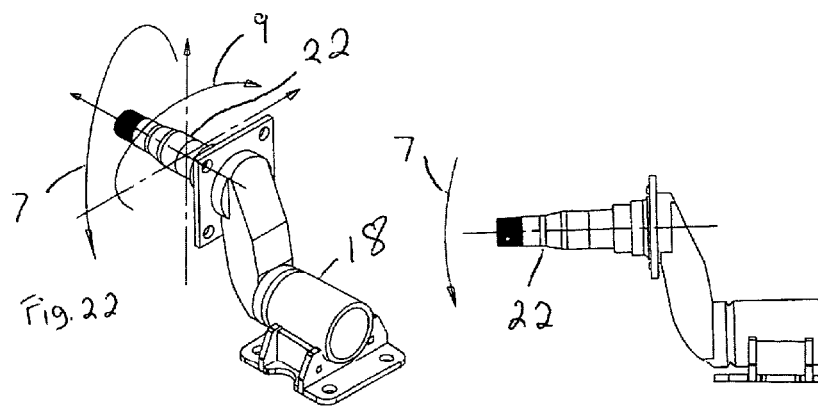
FIG. 22 is a perspective view of the control arm portion of the present invention.
Figure 23:
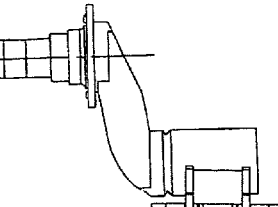
FIG. 23 is a side view of the control arm portion of the present invention.

Referring now to FIGS. 18 to 23, there are a variety of ways of creating camber or toe-in in the present invention. Camber and toe-in are the terms used to describe wheels which are angled slightly from the vertical in order to change ride characteristics. In the example shown in FIGS. 18 and 19, mounting holes 66 and 67 can be formed to be slightly off center such that they are not exactly coaxially aligned. This causes the rest of the suspension unit to be positioned at a slight angle sufficient to create the desired camber. If the apertures are vertically offset slightly, then a camber is created. If the apertures are horizontally offset slightly, a toe-in is created. Alternatively, as seen in FIGS. 20 and 21, a slight toe-in relative to fore-aft axis of the control arm 14 can be created by slightly rotating the square formation 51 of apertures 50 in the direction indicated by arrow 53. Finally, as seen in FIGS. 22 and 23, tilting spindle arm 22 down slightly (arrow 7) will impart a positive camber while slightly angling the spindle arm towards the front of the vehicle (arrow 9) will induce a positive toe-in.

Figure 34:
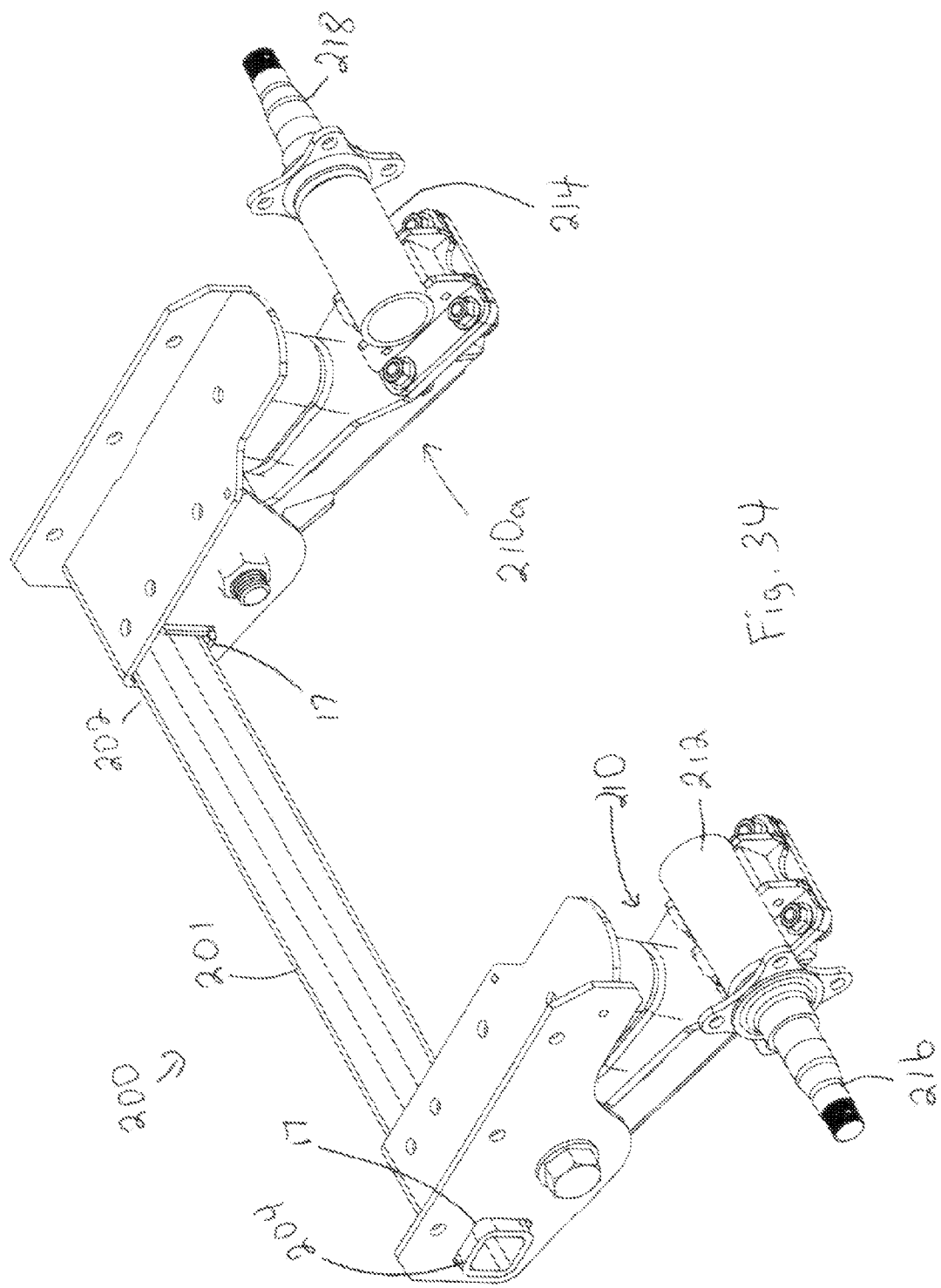
FIG. 34 is a perspective view of two suspension units made in accordance with the present invention being joined together by an assembly bar.

Referring now to FIG. 34 it is possible to place two suspension units on the frame of a vehicle (not shown) particularly where that vehicle has no axel. As seen in FIG. 34, two suspension units, namely suspension unit 210 and suspension unit 210a can be temporarily coupled together to form a unitary dual suspension unit 200 by the addition of a square profiled assembly bar 201. Suspension unit 210a is a mirror of suspension unit 210, the only difference being the orientation of spindle 212 is opposite that of spindle 214 by virtue of the fact that spindle 214 is mounted in the opposite direction. Each suspension unit has a rectangular aperture 17 in the hanger bracket portion of the suspension unit which is dimensioned to snugly receive an end of assembly bar 201. Assembly bar 201 has a square (or rectangular) cross-sectional profile. Apertures 17 are dimensioned to exactly match the cross-sectional profile of assembly bar 201 such that when suspension units 210 and 210a are coupled by the assembly bar, spindle arms 216 and 218 of spindles 212 and 214 are coaxially aligned. This makes it much simpler for suspension units 210 and 210a to be correctly mounted to a vehicle frame (not shown) so that the two spindles are aligned correctly. After the individual suspension units are mounted to the vehicle frame, assembly bar 201 may be removed. However, where additional rigidity is required for the suspension of the vehicle (not shown), assembly bar 201 may be permanently mounted in place by welding, bolting, brackets or by other means known generally in the art. It will be appreciated that in the example illustrated in FIG. 34, assembly bar 201 has a square cross-sectional profile; however, elongated bars having a rectangular or other profile may be used provided that the corresponding apertures 17 closely match the cross-sectional profile of the assembly bar used.

Referring now to FIGS. 24, 25 and 26, an alternate configuration (embodiment) of the present invention is shown which is configured for tandem applications. Suspension unit 100 consists of a frame bracket 108, an equalizer arm 102, two control arms 118 and 120 mounted on opposite ends of equalizer 102. Equalizer 102 is pivoted preferably in the middle of the frame bracket 108. Each wheel hub 110 or 112 is mounted to the end of its corresponding control arm 118 or 120 either directly or via an interface component like hub interface 114 and 116.

Control arms 118 and 120 are both pivotally connected to equalizer 102 by control arm pivot pins 124 and 126, respectively. Equalizer 102 is, in turn, pivotally connected to hanger 108 by equalizer pivot pin 122 and its corresponding bushing or bushings. Hanger 108 is rigidly connected (bolted, welded, etc.) to the frame of the vehicle or the frame platform that needs to be suspended. Two similar suspension units 100 may be used on a vehicle, one at each side, to make a complete suspension for a tandem vehicle (with four wheel hubs).

Each control arm is independently mounted to the equalizer and suspended using two springs, a jounce spring 128 and a rebound spring 130. The jounce and rebound springs could be of different sizes so the load capacity of them could be different. In this invention the jounce and rebound springs are positioned at two opposite faces or sides of the control arm relative to the pivot point of the control arm; therefore the direction of the load applied to the control arm by each of these two springs will always be opposite. For example if normal load on the vehicle increases the load on the jounce spring increases while the load on the rebound spring decreases until the rebound spring becomes partially or completely unloaded. This process continues until eventually the suspension system stabilizes again.

The size and capacity of these two springs could be different and therefore the magnitude of these opposite loads could be different as well; however, at each instance, the load on only one of the two springs will be prevailing (depending on the direction and magnitude of the external load on the suspension). Preferably, both springs are partially preloaded when the suspension is in a fully relaxed position (or when there is no external load on the suspension). Likewise, both springs are preferably both in contact and never get fully relaxed in a fully loaded position of the control arm regardless of the position of the control arm. This way, the contact between the control arm and both springs will be maintained at all times and the control arm never gets slack or starts vibrating. The final angular position of the control arm relative to the equalizer will be an outcome of the load on its corresponding wheel hub, the geometry of the suspension, the spring rate of each of the two springs, and finally the amount of preload on each spring when the suspension was fully unloaded.

The control arm which has its spindle or hub towards the front of the vehicle will be considered the leading arm and the other arm which has its spindle or hub towards the rear will be considered the trailing arm. The equalizer is located somewhere between the leading arm and the trailing arm. The horizontal distance from the center of the equalizer to the center of each hub or wheel is very important. In FIG. 25 that measurement (for the leading arm), is the horizontal distance from center of bolt 122 to center of hub 110. The corresponding measurement for the trailing arm is the horizontal distance from center bolt 122 to center of hub 112. The ratio between these two measurements will be inversely proportional to the load that each wheel (front or rear) would carry. In most cases that ratio by design should be 50/50. Such suspension would be completely equalized and the total load will be equally distributed on the two wheels.

FIG. 26 illustrates the component parts of one of the wheel suspension units, namely suspension 106. The component parts of each wheel suspension will now be discussed with reference to suspension 106. As seen in FIG. 26, equalizer 102 has opposite ends 142 and 140, with suspension 104 formed on end 142 and suspension 106 formed on end 140. Suspension 106 includes jounce spring 128 and rebound spring 130, which are preferably made of a strong resilient elastic polymer material such as natural rubber. Control arm 120 has flat surface 132 which is dimensioned and configured to receive jounce spring 128. Jounce spring 128 preferably has nubs 141 which are dimensioned to be snuggly retained in apertures 142 formed on flat surface 132 of control arm 120. Jounce spring 128 is dimensioned to fit between control arm 120 and end 140 of equalizer 102 so as to cushion the upward movement of control arm 120. Control arm 120 has flat end 134 and pivotal connector element 136 positioned between the flat end and flat surface 132. Bushing 138 is used to couple connector element 136 to control arm pivot pin 126 in order to permit control arm 120 to freely pivot relative to equalizer 102 and also to give the control arm 120 some lateral flexibility relative to equalizer 102 as needed. Apertures 123 are provided on equalizer 102 to receive control arm pivot pin 126. The two opposite holes of aperture 123 at each end of equalizer 102 may intentionally be designed to be misaligned relative to the axis of the equalizer connector 145 or its pin 122. That misalignment may be necessary to allow for a proper alignment of individual control arms, 118 and 120, and eventually proper alignment of their corresponding hubs, 110 and 112.

Equalizer 102 has connector element 145 preferably a tubular shape preferably at the exact center of the equalizer between ends 140 and 142. Bushing 147 is provided to couple connector element 145 to equalizer pivot pin 122 to permit the equalizer to pivot freely on hanger 108 and to give it some level lateral flexibility as needed. Bump stops 144 and 150 are bolted to equalizer 102 to prevent the equalizer from being damaged in the event it pivots sufficiently to contact the frame of the vehicle (not shown). Bump stop 144 is bolted to end 140 of equalizer 102 by means of bolt 148 passing through aperture 146.

Referring now to FIGS. 27 through 30, equalizer 102 includes a central member 150 mounted in the equalizer. Central member 150 has walls 152 and 154. Wall 152 acts as a mount for rebound spring 130 (see FIG. 26) and its corresponding rebound spring on the opposite side (not shown). Various elements are provided on equalizer 102 to allow for the mounting of component parts discussed previously, such as connector tube 145, and apertures 123 and 146.

Although shock absorber are not shown in the figures presented in this invention application, they can easily be adapted and be used in conjunction with the rest of the suspension components introduced in the present invention to further enhance the ride quality of the suspension.

Referring back to FIGS. 24 to 26, the present invention has many advantages over the prior art. For example, the suspension system may not require an axle (two axles for a tandem applications), thereby saving space and making suspension system more compact. A suspension with no axle would have a lower unsprung to sprung weight ratio and therefore could have an improved ride quality. Unlike leaf spring suspensions (which require axles), a comparable suspension with no axle would fit on a wider range of vehicles because the width of the frame (to determine the correct axle) becomes irrelevant. That would simplify the ordering process for suppliers since they may not need to inquire about the hub face to hub face measurement of the vehicle any more; besides using such suspension would save in reducing the size of inventory of different size axles for manufacturers/suppliers. Furthermore, it would help reduce the (physical) size of running gear components to be shipped (ordinarily they include axles and related components, axle seats, U-bolts, etc; but not with this design). In addition, the time to install such axles will be saved. The present suspension is highly responsive, the jounce and rebound springs provide good stability and control. There would be no leaf spring to break or to permanently deform; there would be no (complicated and costly) air supply components to maintain i.e. air springs, compressors, height control valves and other air related components which would normally require a high level of service and maintenance.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims

The invention claimed is:

1. A suspension unit for suspending a wheel to a vehicle's frame, the suspension unit comprising:
   a. a hanger for mounting to the vehicle's frame;
   b. a control arm having opposite first and second ends, the control arm being pivotally mounted to the hanger at a pivot point positioned between the first and second ends;
   c. a spindle arm mounted to the first end of the control arm, the spindle arm configured to mount to the wheel;
   d. a jounce spring made of an elastomeric polymer material mounted between the control arm and the hanger at a first point on the control arm positioned between the pivot point and the first end;
   e. a rebound spring made of an elastomeric polymer material mounted between the control arm and the hanger at a second point of the control arm adjacent the second end;
   f. the control arm and hanger being configured such that when the first end of the control arm pivots towards the vehicle's frame, the jounce spring is compressed and the rebound spring is relaxed;
   g. the control arm and the hanger being further configured such that when the first end of the control arm moves away from the frame the jounce spring is relaxed and the rebound spring is compressed, and
   h. wherein both the jounce spring and rebound spring are preloaded such that both the jounce and rebound springs are under compression when the control arm is at a rest.

2. The suspension unit defined in claim 1 wherein the control arm and hanger are configured such that the jounce and rebound springs are compressed and relaxed in approximately perpendicular directions.

3. The suspension unit defined in claim 2 wherein the spindle arm is bolted to the first end of the control arm.

4. The suspension unit defined in claim 3 wherein the hanger has a top wall and back wall, and a pair of side walls depending from the top wall, the back wall being perpendicular to the top wall, the control arm being pivotally mounted between the side walls of the hanger, the control arm having a top surface with the jounce spring positioned between the top wall of the hanger and top surface of the control arm.

5. The suspension unit defined in claim 1 wherein the hanger has a top wall, a perpendicular wall extending downwardly from the top wall, and a pair of side walls depending from the top wall, the control arm being pivotally mounted between the side walls of the hanger, the control arm having a top surface with the jounce spring positioned between the top wall of the hanger and top surface of the control arm, the control arm having an angled flat surface adjacent the second end, the angled flat surface at a near 90 degree angle from the top surface, the rebound spring being positioned between the angled flat surface and the perpendicular wall.

6. The suspension unit defined in claim 5 further comprising another identical suspension unit as defined in claim 5 to form a pair of suspension units wherein the side walls of the hanger of each of the suspension units in said pair of suspension units have a pair of coaxially aligned rectangular apertures dimensioned to snugly receive an end of an elongated assembly arm having a cross-sectional profile matching the rectangular apertures, the elongated assembly arm linking each of said suspension units in said pair of suspension units together.

7. The suspension unit defined in claim 1 wherein the hanger forms an elongated equalizer member having opposite first and second ends, a first suspension unit with a first control arm, first spindle arm, first jounce spring and first rebound spring mounted on the first end of the equalizer and a second suspension unit with a second control arm, second spindle arm, second jounce spring and second rebound spring mounted on the second end of the equalizer, the equalizer member being pivotally connected to the frame of the vehicle by a pivotal connection positioned mid way between the first and second ends of the equalizer.

8. The suspension unit defined in claim 7 wherein each end of the ends of the equalizer member has a top wall, a perpendicular wall extending downwardly from the top wall, and a pair of side walls depending from the top wall, each control arm being pivotally mounted between the side walls of the equalizer, each control arm having a top surface with one of the jounce springs positioned between the top wall of the hanger and top surface of said control arm, each control arm having an angled flat surface adjacent the second end of said control arm, the angled flat surface at a near 90 degree angle from the top surface, one of the rebound springs being positioned between the angled flat surface of each control arm and the perpendicular wall of the corresponding end of the equalizer.

9. The suspension unit defined in claim 7 wherein the suspension unit is configured such that the jounce and rebound springs are compressed and relaxed in approximately perpendicular directions.

* * * * *